United States Patent [19]

Kuhn et al.

[11] Patent Number: 4,900,098
[45] Date of Patent: Feb. 13, 1990

[54] ELECTRO-PNEUMATIC TRACTOR-TRAILER BRAKE SYSTEM

[75] Inventors: Lawrence H. Kuhn, New Haven; Michael B. Durant, Fort Wayne, both of Ind.

[73] Assignee: Navistar International Transportation Corp., Chicago, Ill.

[21] Appl. No.: 392,814

[22] Filed: Aug. 11, 1989

Related U.S. Application Data

[62] Division of Ser. No. 268,426, Nov. 8, 1988, Pat. No. 4,877,294.

[51] Int. Cl.$^4$ ............................................. B60T 17/00
[52] U.S. Cl. ........................................................ 303/1
[58] Field of Search ........................ 303/1, 7, 8, 9, 11, 303/70, 78, 80, 85

[56] References Cited

U.S. PATENT DOCUMENTS 2,661,847 12/1953 Buettner ............................. 303/1 X
2,761,529 9/1956 Wisenbaugh ....................... 303/1 X
4,586,584 5/1986 Auman et al. ...................... 303/7 X Primary Examiner—Duane A. Reger
Attorney, Agent, or Firm—F. David AuBuchon; Dennis K. Sullivan

[57] ABSTRACT

The spring-operated parking brakes of a tractor-trailer are controlled by a novel electro-pneumatic system. Pneumatic valving through which compressed air is conducted is mounted on the tractor chassis and coupled via an electronic circuit to two hand-operated control devices on the dash of the tractor cab, one for the trailer parking brakes only and the other for the tractor parking brakes. The latter device inherently operates the trailer parking brakes via the circuit if they are not already applied, and the circuit incorporates a sequencing function for operating the trailer brakes slightly before the tractor brakes when the tractor parking brake control is operated. Compressed air for the system is obtained via an engine-driven compressor which charges a tank. A pressure transducer monitors tank pressure for the circuit with the circuit maintaining tank pressure through selective loading and unloading of the compressor. Purging of the dryer is coordinated with compressor unloading. The pressure transducer also interacts with the parking brake control devices and the parking brakes such that when the pressure drops below a certain level, the parking brakes are automatically applied. The circuit also gives an alarm before the pressure reaches that level.

2 Claims, 6 Drawing Sheets

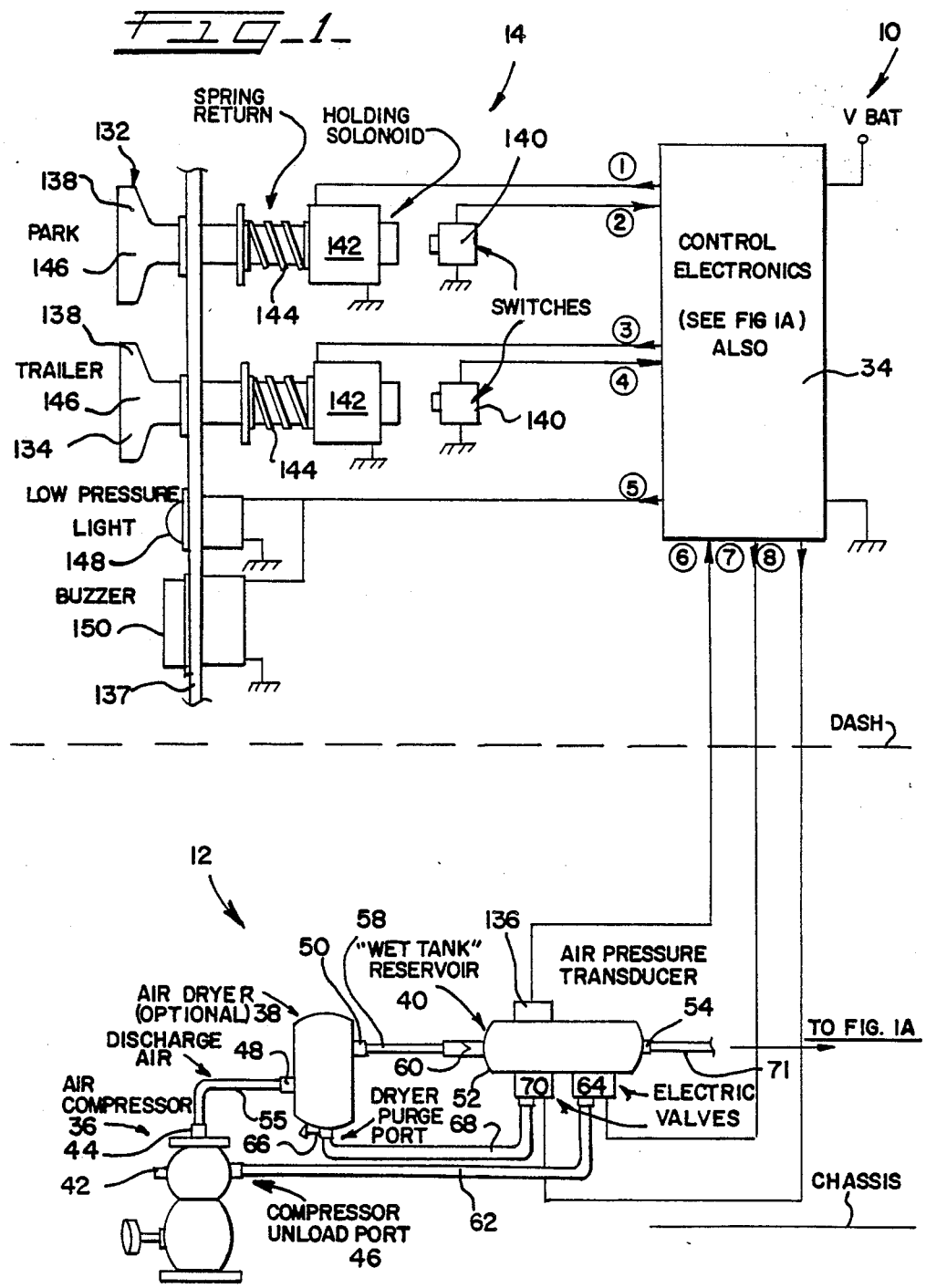

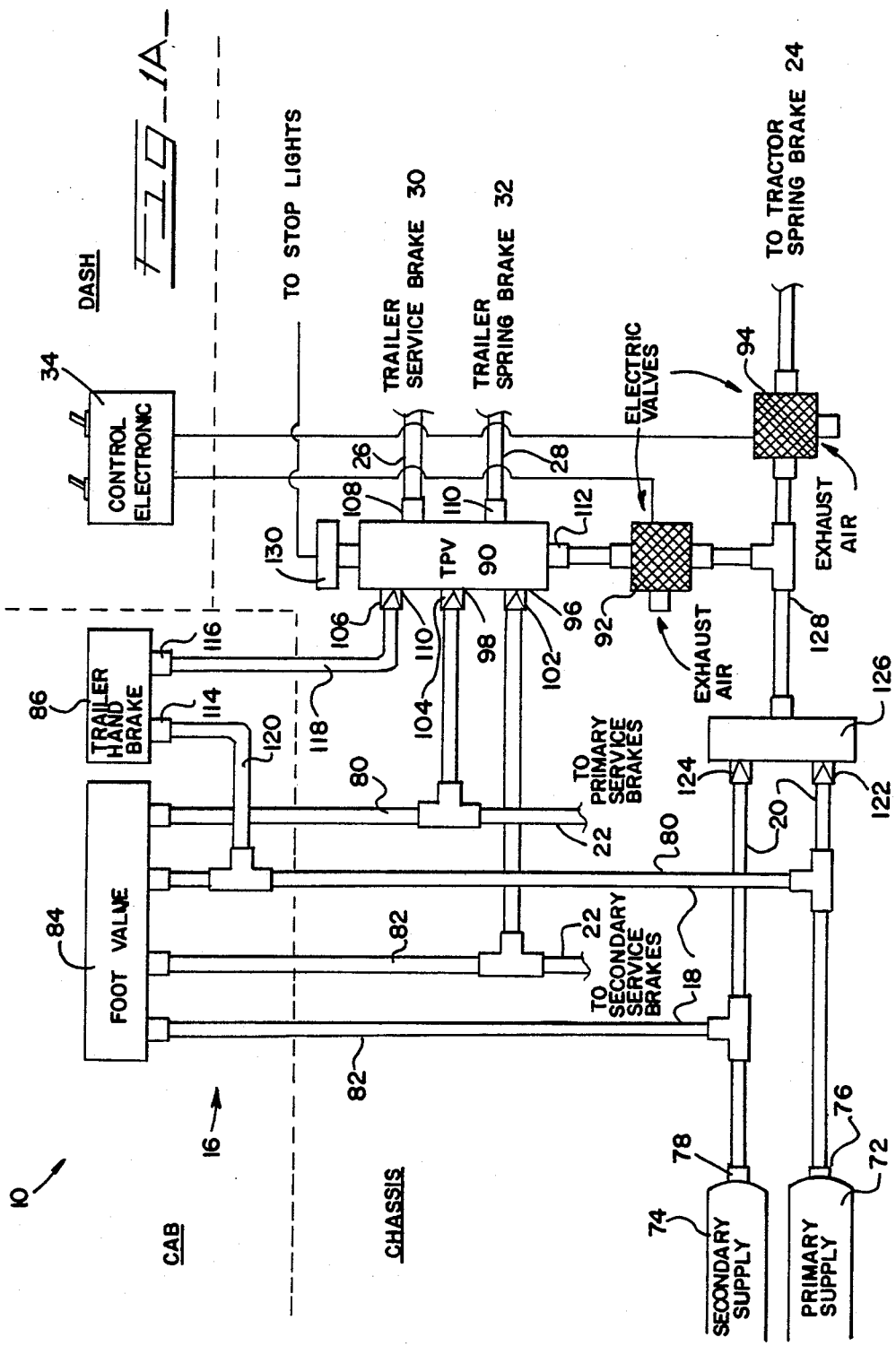

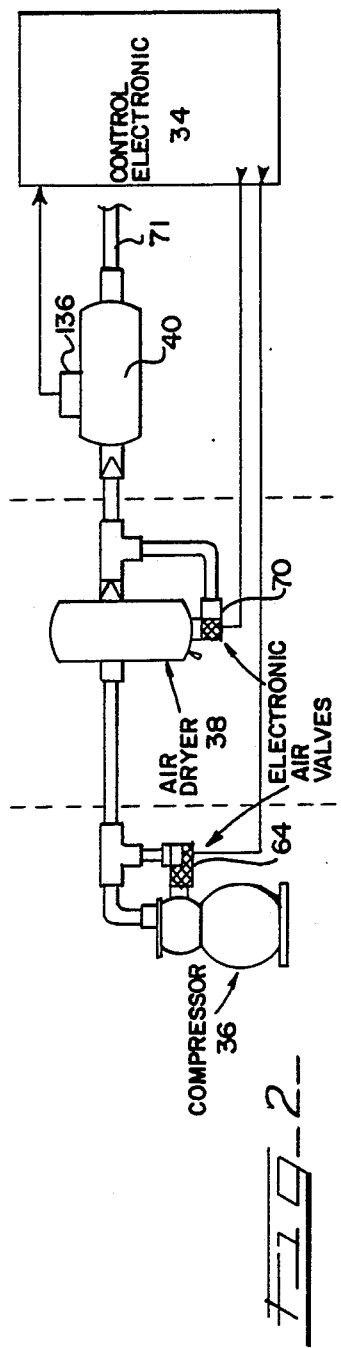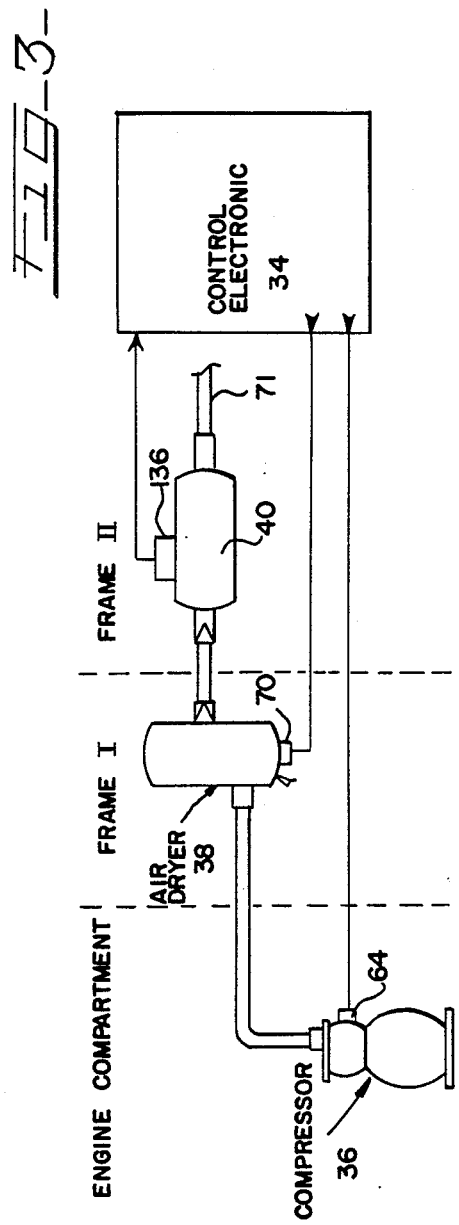

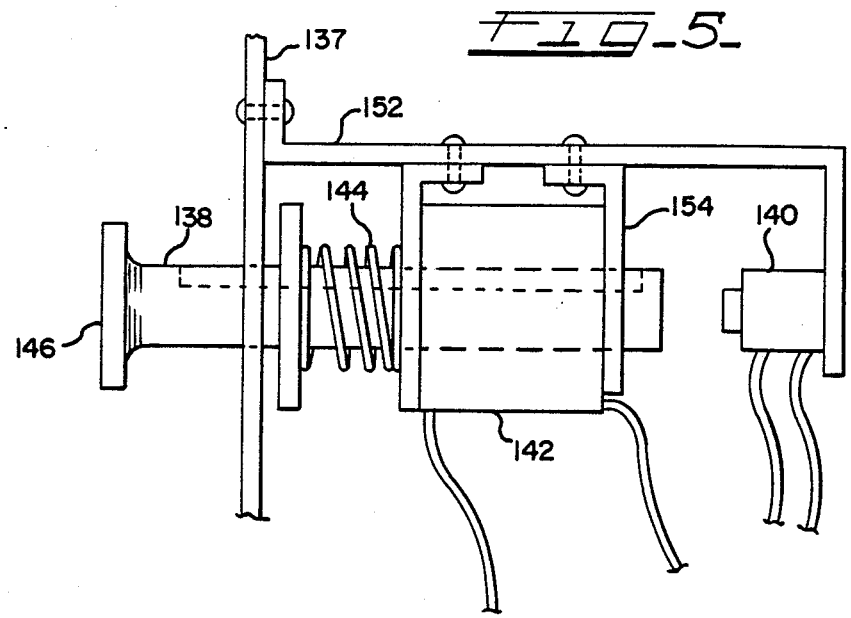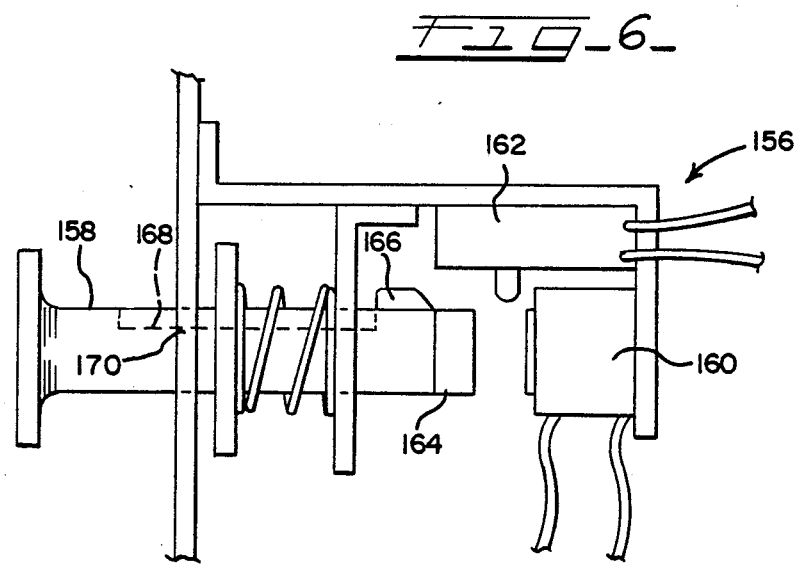

ELECTRO-PNEUMATIC TRACTOR-TRAILER BRAKE SYSTEM

This is a division of application Ser. No. 07/268,426, filed Nov. 8, 1988 now U.S. Pat. No. 4,877,290.

BACKGROUND AND SUMMARY OF THE INVENTION

This invention relates to improvements in tractor-trailer pneumatic brake systems.

An important component of our national transportation system is the highway tractor. A substantial portion of manufactured goods and raw materials are transported over the nation's roads and highways in trailers which are hauled by highway tractors. A single highway tractor is capable of transporting a trailer having a load which can run into the order of many tons.

Pneumatically-operated brake systems have been adopted for such tractor-trailer combinations. Likewise, the "fifth wheel" has been adopted as the mechanical means by which a trailer connects to a tractor.

In a tractor-trailer combination, the trailer brakes must be placed under the control of the driver in the tractor. This is accomplished by appropriate pneumatic circuitry on the tractor which is connected via air lines with compatible pneumatic circuitry on the trailer when the trailer is mechanically connected to the tractor's fifth wheel for hauling. The pneumatic circuitry on the tractor contains various valves through which control over the tractor's and trailer's pneumatic brakes is exercised by the driver.

The tractor contains a pneumatic power supply which comprises an air compressor driven by the tractor's engine to draw and compress air into one or more tanks which form a reservoir or reservoirs of compressed air at suitable pressure for operating the pneumatic brakes of the tractor and those of a trailer when such a trailer is connected to the tractor for over-the-road hauling. The compressor is selectively loaded and unloaded in accordance with pressure conditions in the tank to maintain a certain pressure of compressed air in the tank or tanks. Such tanks are typically mounted on the chassis of the tractor, and pneumatic lines extend from such tanks to pneumatic valves located in the tractor cab for use by the driver in exercising control over the tractor's brakes and those of a trailer when connected to the tractor for hauling.

The service brake system of the tractor comprises a foot pedal operated pneumatic valve which the driver uses to apply the service brakes of the tractor's wheels and also those of a trailer when connected to the tractor. The tractor cab also contains a pneumatic trailer brake valve which the driver can operate by hand, enabling the driver to apply the trailer service brakes in a controlled manner independently of the tractor's service brakes. This trailer brake valve gives the driver certain control which can be important at certain times in the operation of the tractor-trailer combination.

Additionally, the tractor-trailer combination comprises parking brakes commonly of the type known as spring brakes. The spring brakes are not a substitute for the service brakes; rather they are intended to lock the wheels when the tractor-trailer combination is parked. When the tractor is disconnected from the trailer, the trailer's parking brakes are automatically applied to prevent trailer roll-away. When no trailer is connected to the tractor, the tractor parking brakes may also be applied by the driver to lock the tractor wheels. Controls for operating the parking brake systems are in the tractor cab for manual activation by the driver. The parking brakes of both tractor and trailer also are adapted for operation in response to certain conditions of the service brake system, such as when the pressure of compressed air in the tractor's compressed air storage tank or tanks drops below a certain threshold.

In the fully pneumatic air brake systems which are currently in use, pneumatic lines are routed into the tractor cab where the pneumatic brake controls are located. For convenience of the driver of the tractor, the tractor and the trailer parking brake controls are typically mounted on the dash, and it is therefore necessary to route pneumatic lines to this area of the cab.

One aspect of the present invention relates to a new and unique organization and arrangement of various component parts of a pneumatic-operated brake system of a tractor, both for the tractor per se and for the tractor-trailer combination. This novel organization and arrangement can contribute to reducing manufacturing and maintenance costs. Certain of the pneumatic components heretofore mounted inside the cab are disposed external to the cab on the tractor chassis. Control of the pneumatic brakes is accomplished through an electro-pneumatic system rather than a system which is strictly pneumatic. More compact electrical and electronic controls are mounted in the cab's dash and connected by electric wires to pneumatic hardware components which are mounted on the chassis external to the cab. This frees the space in the area of the dash and facilitates installation of the controls in the cab. The use of electric wires instead of air lines between the cab and the chassis also provides a simplification. The number of air line couplings is reduced, a significant cost saving, and the installation of electric wires is considerably easier than installing pneumatic air lines. Attributes of the invention are especially significant in cab-over type tractors where lines between the cab and the chassis must be routed through the pivot point of the cab on the chassis.

A still further advantage of the invention is that changes which may be required, such as by governmental regulation, can often be accomplished more efficiently and economically because it is often possible to make changes in electronics instead of in hardware, such as valves, lines, and couplings.

Further consequences of the improvements afforded by the invention are reduction in cab noise levels due to removal of certain pneumatic components from the cab, and a modest, but finite, reduction in vehicle curb weight.

Another aspect of the invention relates to the manner in which the air compressor is operated and the air dryer is purged of condensed moisture. The compressor is driven by the tractor's engine, and it is loaded and unloaded in accordance with the level of pressurized air in the storage tank or tanks. Because of the inherent nature of the air compression process, moisture condenses in the compressed air and must be removed Existing compressors include governors which control compressor loading and unloading in accordance with the level of air pressure sensed at the storage tank or tanks. A pneumatic line transmits the tank pressure to the compressor governor, and when the sensed pressure drops below a threshold, the compressor is loaded to the tank, drawing air and compressing it into the tank. When the tank pressure rises to a certain level, the compressor is once again unloaded, ceasing to compress air into the tank. This cycle periodically repeats in accordance with demand, serving to maintain tank pressure within a certain range.

In the previous design, purging of moisture from the pneumatic system is concurrent with unloaded operation of the compressor. Because a substantial proportion of the tractor's operating time comprises the compressor being unloaded, the dryer purge time is much greater than necessary to accomplish sufficient purging. During purging of the dryer, a low pressure path is created between the compressor intake port and atmosphere. In a tractor which has a turbo-charged engine the compressor may draw the boost air from the turbocharger. Consequently, when purging occurs, boost pressure may be lost through this low pressure path resulting in some attenuation of engine power; this may be manifested at times by the need for the driver to downshift in order to overcome such temporary power attenuations. The mechanical governor system for the air compressor may also require periodic maintenance which often includes the need for re-calibration.

A still further aspect of the invention relates to improvements in the compressor loading-unloading cycle and dryer purge cycle which can produce greater accuracies and consistencies than in mechanical-pneumatic systems, thereby making maintenance and re-calibration less frequent. Certain adjustments, when needed, can be accomplished in the electronics, rather than in hardware. The improvements are compatible in many instances with compressors and dryers currently in use so that the improvements can be incorporated without the necessity of completely re-tooling the system.

A still further aspect of the invention relates to improvements in the parking brake control system. As alluded to earlier, current systems use rather large, complicated pneumatic valves located in the dash area of the tractor cab. Requirements for sequencing and low-pressure cut-out have added to the complexity, cost, and size of components that must be placed in the dash, and there are increased interior noise levels due to the routing of air lines into the cab. According to this further aspect of the invention, certain pneumatic circuit components are replaced by novel electromechanical control devices, and associated electronics, in the cab. These particular control devices are the parking brake controls for the tractor and the trailer. There are two such devices. One is for the trailer alone; the other is for the tractor, but it also interacts with a trailer when connected to the tractor such that the trailer parking brakes are operated if the driver operates the tractor parking brakes. The sequencing function of applying the trailer parking brakes just prior to the tractor's in embodied in the electronics. The devices are also interactive via the electronics with an electric pressure transducer which senses the level of air pressure in the tank or tanks such that if the sensed pressure drops below a certain threshold, the parking brakes are automatically applied. The electronics however also contains an alarm to alert the driver to this possibility before it occurs so that typically there will be time for the drive to initiate action himself before the parking brakes are applied. The pressure transducer signal is also used by the electronics in controlling the compressor loading-unloading and dryer purge functions.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIGS. 1 and 1A taken together constitute a schematic diagram of a system embodying principles of the invention.

FIG. 2 is a schematic diagram illustrating a modification of a portion of the system shown in FIG. 1.

FIG. 3 is a schematic diagram illustrating a second modification.

FIG. 5 is a side view of one of the components schematically shown in FIG. 1 illustrating more detail.

FIG. 6 is a view similar to FIG. 5 showing another embodiment.

DESCRIPTION OF THE PREFERRED EMBODIMENT

Figure 4:
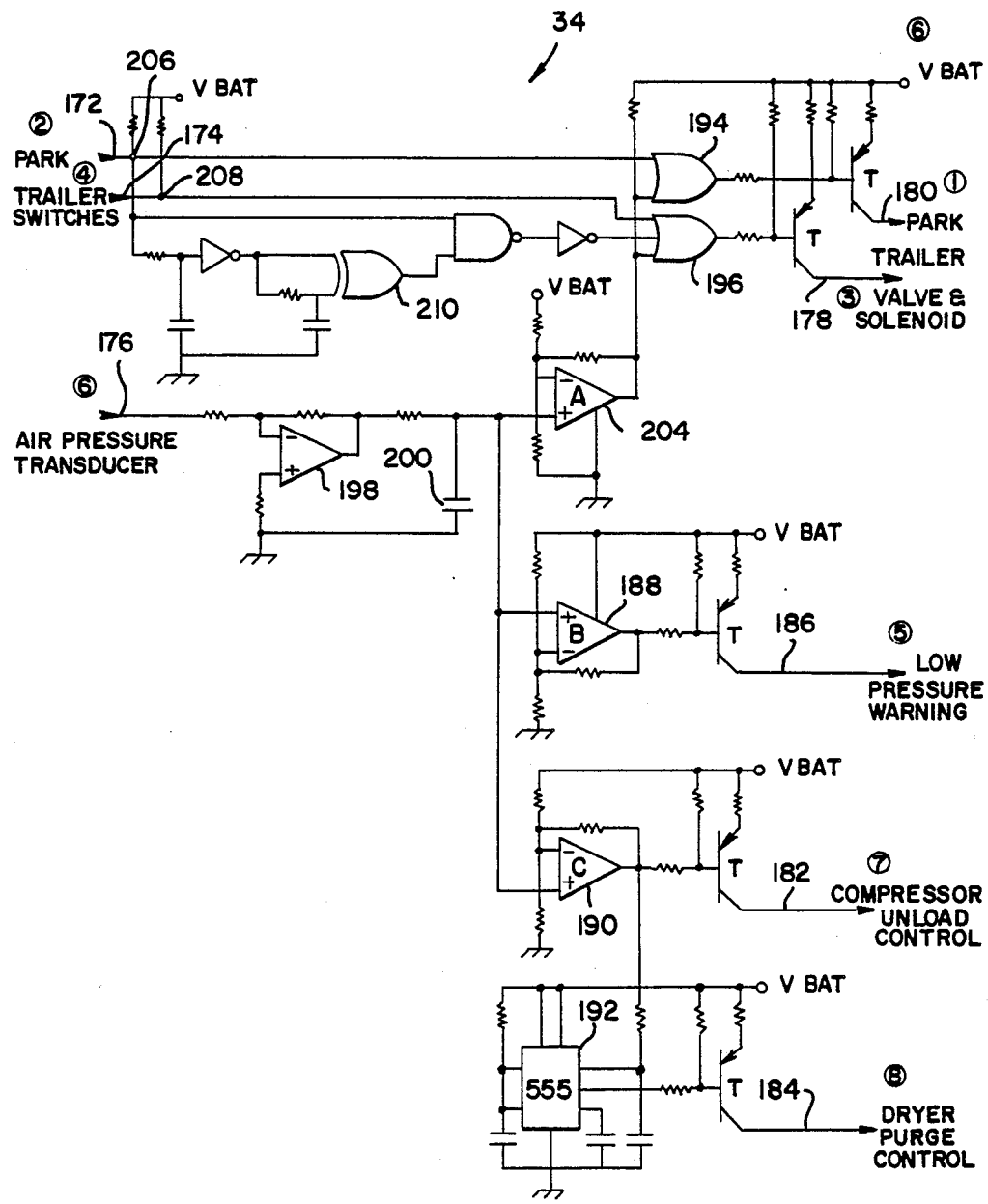
FIG. 4 is a detailed schematic diagram of another portion of the system of FIG. 1.

The overall organization and arrangement of an electro-pneumatic tractor-trailer brake system 10 according to the present invention is shown in FIGS. 1 and 1A. For convenience in explanation, the system may be considered to comprise a pneumatic power supply 12 (FIG. 1), parking brake controls 14 (FIG. 1), service brake controls 16 (FIG. 1A), pneumatic circuits 18 and 20 respectively for conducting pressurized air to the tractor's service and parking brakes 22 and 24 respectively (FIG. 1A), pneumatic circuits 26 and 28 respectively for conducting pressurized air to the trailer's service and parking brakes 30 and 32 respectively (FIG. 1A), and control electronics 34 (both Figs.).

The tractor construction comprises a chassis and a cab. Road-engaging wheels are suspended from the chassis, and the chassis contains a powertrain for imparting automotive operation to the tractor. The driver is seated inside the cab which mounts on the chassis, and the dash, or instrument panel, inside the cab contains various controls. FIGS. 1 and 1A have been partitioned and labelled to indicate the locations of various components in the tractor.

The pneumatic power supply 12 is representative, comprising an air compressor 36, a dryer 38, and a "wet tank" reservoir 40. Compressor 36 is pulley-driven from the tractor's engine and comprises an inlet 42, an outlet 44, and an unloading port 46. Dryer 38 has an inlet 48 and an outlet 50, and tank 40 has an inlet 52 and an outlet 54. The compressor outlet 44 is connected by a pneumatic line 56 to the dryer inlet 48, and the dryer outlet 50 is connected by a pneumatic line 58, containing a check valve 60, to the tank inlet 52. Compressed air for the system is obtained from tank 40 at the tank outlet 54.

The compressor is operated to loaded and unloaded conditions via unloading port 46. A pneumatic control line 62 connects between tank 40 and unloading port 46. This control line contains an electric-actuated pneumatic valve 64 which is under the control of control electronics 34. When valve 64 is open, tank pressure is communicated to unloading port 46, and the application of tank pressure to the unloading port causes the compressor to operate in the unloaded condition. When valve 64 is closed, unloading port 46 is exhausted, causing the compressor to operate in the loaded condition. In the loaded condition, the compressor draws air via inlet 42, and compresses it into tank 40 via line 56, dryer 38, line 58, and check valve 60.

Dryer 38 has a pilot-operated purge port 66 via which condensed moisture which has been removed from the compressed air by the dryer is purged from the system. A pneumatic line 68 which contains an electric-actuated pneumatic valve 70 is connected between tank 40 and a pilot port associated with purge port 66. Valve 70 is under the control of control electronics 34. When valve 70 is open, compressed air is conducted to the purge port's associated pilot port causing the normally closed purge port to open and allow moisture to escape from the dryer. While this is happening, check valve 60 is preventing compressed air in tank 40 from escaping through the dryer. When valve 70 is closed, the pilot pressure is removed, causing the purge port to close thereby ending the purge cycle. As will become more apparent from the ensuing description, the control electronics exercises close control over the amount of purge time.

As mentioned above, the illustrated pneumatic power supply is representative. It is portrayed as having the tank outlet 54 connecting via a line 71 to additional tanks 72 and 74 which constitute primary and secondary supply tanks for a service brake system which is of the type comprising primary and secondary services brakes. The particular tank configuration and the particular service brake configuration do not constitute limitations on the generic aspects of the invention, and that is why the particular system which is illustrated is said to be representative.

The two tanks 72, 74 have respective outlets 76, 78 which connect to the two pneumatic circuits 18 and 20. Circuit 18 comprises primary and secondary branches 80, 82 which run from the chassis-mounted tanks 72, 74 to the cab-mounted pneumatic service brake valve 84; from valve 84 these two branches run back to the chassis and to the primary and secondary brakes for the tractor's wheels, such brakes being collectively identified by the assigned numeral 22.

The service brake controls 16 comprise a pneumatic trailer brake valve 86 in addition to service brake valve 84. Service brake valve 84 is foot-operated by the driver to operate the tractor service brakes 22. When a trailer is coupled for hauling to the tractor, the trailer's service brakes are slaved to the tractor's service brakes so that the trailer's service brakes operate in unison with the tractor's service brakes whenever service brake valve 84 is operated by the driver. When a trailer is coupled to the tractor, the service brakes of the trailer can be manually operated via valve 86 without causing the tractor's service brakes to be operated. This capability is important in certain driving situations, and valve 86 is typically mounted on the steering column of the tractor for manual operation by means of a lever.

In accordance with certain principles of the invention, the slaving of the tractor service brakes to the trailer's service brakes is accomplished via chassis-mounted pneumatic components. Such components are illustrated in FIG. 1A as a multi-port pneumatic valve 90 and a pair of separate electric-actuated pneumatic valves 92, 94. Valve 90 is a conventional valve used for coupling the pneumatic lines on a tractor with those on an attached trailer; it is commonly referred to as a TPV valve. However, rather than being mounted in the cab, as in a conventional strictly pneumatic system, valve 90 is chassis-mounted.

Valve 90 has three inlet ports 96, 98, 100, each of which has an associated check valve 102, 104, 106. It also has two outlet ports 108, 110 and a control port 112. Ports 96 and 98 are connected through their respective checks with the two branches 82, 80 respectively of circuit 18 returning from service brake valve 84 to the chassis. Manual valve 86 has an inlet 114 and an outlet 116, and port 100 is connected through its check valve via a line 118 to outlet 116. Inlet 114 is connected via a line 120 which tees into branch 80 which comes into the cab from tank 72. Outlet port 108 provides for connection of the trailer service brakes while outlet port 110 provides for connection of the trailer parking brakes The outlets of tanks 72, 74 are connected through respective check valves 122, 124 at the two inlets of a reverse tee 126 whose outlet is connected to the inlets of valves 92, 94 via a line 12. The outlet of valve 92 connects to control port 112 of TPV valve 90 while the outlet of valve 94 connects to the tractor's parking brakes. Both valves are under the control of control electronics 34.

Valve 92 controls the application of pressurized air to control port 112. When pressurized air is applied to control port 112, outlet port 108 is open through valve 90 to the three inlet ports 96, 98, 100 while outlet port 110 is open to control port 112. In this condition of valve 90, the trailer service brakes are slaved to the tractor's service brakes whereby operation of pedal valve 84 will apply both the tractor's and the trailer's service brakes. For this same condition of valve 90, operation of trailer manual brake valve 86 will operate the trailer service brakes, and the pressure conducted from control port 112 through the valve to outlet port 110 will hold the spring-operated trailer parking brakes released so that they are not applied. When pressurized air is removed from control port 112, pressure which holds the trailer spring brakes released is also removed and the springs apply the trailer parking brakes. Also associated with valve 90 is a switch 130 which operates the stop lights of the tractor and trailer when the service brakes are operated.

When valve 94 is open, tank pressure is conducted through to the tractor parking brakes to hold them released. However, when valve 94 is closed, the pneumatic pressure applied to the tractor parking brakes is exhausted, and the springs operate the tractor parking brakes.

In summary then, both valves 92, 94 are normally held open by being electrically actuated from control electronics 34, but when the control electronics ceases to actuate valve 92, it closes, exhausting the line connected to its outlet causing the trailer parking brakes to be applied; and when the control electronics ceases to actuate valve 94, it closes, exhausting the line connected to its outlet, causing the tractor parking brakes to be applied.

Referring back to FIG. 1, one will see that there are two control devices 132, 134 associated with the control electronics. Also associated with the control electronics is an electric pressure transducer 136 disposed to sense the pressure of compressed air in the pneumatic power supply. The pressure transducer is mounted on tank 40 to sense the pressure of air inside the tank.

The two devices are part of the parking brake control. Both are of an electro-mechanical construction and are virtually identical. Device 132 is designated PARK and device 134 TRAILER. When the driver desires to operate the trailer parking brakes only, he activates device 134. When he desires to operate the tractor parking brakes, he activates device 132. If a trailer is coupled to the tractor, the activation of device 132 will also cause the trailer parking brakes to be applied without the necessity of the driver activating device 134.

FIG. 1 shows the two devices 132, 134 mounted on a control panel 137 for manual operation by the driver. The illustrated position shows both devices in positions operating the parking brakes of both tractor and trailer despite the redundancy created by the operation of device 134. Each device comprises an operator 138, and in the illustrated position of FIG. 1, each operator 138 has been displaced outwardly away from panel 137. When each operator is displaced inwardly toward the panel from the position illustrated in FIG. 1, it actuates an associated electrical switch assembly 140 connected with control electronics 34 and releases the parking brakes associated therewith.

The condition of each switch 140 is monitored by control electronics 34 to distinguish activation of the corresponding device from non-activation. When the switch assembly 140 of one of the devices is actuated, the control electronics energizes an electro-magnet 142 which is associated with the operator 138 of the device. The energization of the electro-magnet serves to magnetically hold the operator in the switch-actuating position despite the outward urging of the operator by an associated spring 144. In this way, once an operator has been pushed from extended position, as illustrated in FIG. 1, to switch-actuating position, it remains in that position to thereby latch the switch actuated.

The exterior end of each operator 138 comprises a knob 146 which the driver uses to push the operator toward switch-actuating position against the spring force of spring 144. That knob can also be pulled by the driver to displace the operator outwardly against the force of the electro-magnet thereby unlatching the switch. Such pulling action results in de-energization of the electro-magnet, and the outward displacement of the operator is aided by spring 144. Accordingly, once those parking brakes which are under the control of a particular device have been applied, they can be released only by pressing the corresponding operator 138 inwardly to actuate and latch the corresponding electrical switch assembly 140.

The pressure signal from transducer 136 interacts with the devices 132, 134 in a manner which will becomes more apparent from the ensuing description. For the moment it can be noted that if either switch assembly 140 of either device 132, 134 is in a latched condition, a drop in sensed air pressure below a certain threshold will unlatch the switch resulting in all parking brakes being applied. The transducer also acts via the control electronics to operate an alarm which in FIG. 1 is shown as a lamp 148 and buzzer 150 mounted on panel 137. The alarm is given when the sensed pressure drops to a certain threshold which is slightly higher than the threshold which operates the parking brakes. Hence in response to sensing the compressed air pressure in the tank apparently about to drop to an unacceptably low level, an alarm is given to the driver before the parking brakes are actually applied so that in typical situations the operator can take appropriate action before the parking brakes actually come on. The signal from the transducer is also used to control compressor loading-unloading and dryer purge cycles.

Details of device 132 are shown in FIG. 5. The operator 138 is in the form of a cylindrical plunger which is spring-loaded by spring 144. The electric switch 140 and electro-magnet 142 are supported on a framework 152 attached to the control panel. The switch is disposed in alignment with the straight line travel of the plunger and is poised for abutment by the end of the plunger opposite knob 146 when the plunger is pushed inwardly to switch-actuating position. The plunger shaft passes completely through a central circular hole in a bobbin 154 on which turns of the electro-magnet are wound. The plunger contains a suitable magnetically responsive material to be held by the electro-magnet in switch-actuating position when the electro-magnet is energized.

An alternate embodiment of device is shown in FIG. 6 and designated 156. Its plunger 158 is spring-loaded in the same fashion as plunger 138. However its electro-magnet 160 is disposed in alignment with the straight line travel of the plunger, and its electric switch assembly 162 is not coaxial with the plunger, but rather is disposed radially of the plunger axis.

The inner end of the plunger contains a magnetically responsive tip 164 for attraction by electro-magnet 160 when energized. A protrusion 166 on the sidewall of the plunger shaft serves to actuate the switch when the plunger is depressed to brake-releasing position. The protrusion is at a particular radial location on the shaft, and proper circumferential registry is obtained by a key-slot 168 in the shaft which rides in a key 170 on the panel or frame.

This embodiment may be considered to possess certain features which are conducive to lower cost manufacture than the FIG. 6 embodiment. For one, the electro-magnet can be smaller, and need not be wound on a bobbin. The operator can be molded from a suitable plastic and only the tip need be ferrous metal. The overall operation of each device of FIGS. 5 and 6 is equivalent insofar as system functioning is concerned.

With the foregoing description in mind, attention can now be directed to the details of control electronics 34 shown in FIG. 4. The electronic circuitry has inputs 172, 174, 176 which are respectively connected to devices 132, 134, and transducer 136. It has outputs 178, 180 connected respectively to valves 92, 94; outputs 182, 184 connected respectively to valves 64, 70; and an output 186 connected to the alarm lamp and buzzer. Each output comprises a corresponding transistor driver, assigned the reference designation T, whose emitter is referenced to a positive supply voltage and whose collector connects to the particular device connected to the output. When a transistor is non-conductive, current does not flow to the corresponding device, but when the transistor is switched into conduction, current flows to the corresponding device.

Each transistor is under the control of an associated input circuit to the transistor. In the case of both the low pressure warning alarm transistor and the compressor unload control transistor, the associated input circuit is a corresponding comparator stage 188, 190. In the case of the dryer purge control transistor, the input circuit is a monostable type circuit 192 which is triggered from the input stage of the compressor unload control transistor input circuit. The input circuits for the park and trailer transistors which control valves 94, 92 are logic gates 194, 196.

The signal from the air pressure transducer 136 interacts with all transistor input circuits either directly or indirectly. The actual signal from the pressure transducer is first conditioned by a stage 198 including a smoothing capacitor 200 at the output of the stage which filters out high frequency components of the amplified signal to avoid spurious action due to noise or the like.

The output from stage 198 is representative of the actual sensed pressure, and is supplied as an input to stages 188, 190. The other input to each of these two stages is a corresponding reference, namely a low pressure threshold reference for the low pressure warning circuit and a compressor unload threshold reference for the compressor unload control circuit.

So long as the sensed pressure exceeds the low pressure warning threshold reference, the low pressure warning circuit does not cause an alarm to be given. However, if the sensed pressure drops below the threshold reference, the circuit activates the alarm.

So long as the sensed pressure exceeds the compressor unload pressure threshold reference, the compressor unload control circuit causes the compressor to be unloaded, but when the sensed pressure drops below the unload pressure threshold reference, the circuit causes the compressor to be loaded to re-charge the compressed air tank. Both stages 188, 190 contain a certain hysteresis so that cycling of each circuit is minimized. For example, the compressor unload control input circuit may cause loading when the pressure drops to P1 psi with unloading reoccurring only after the pressure has been restored to P1+P2 psi.

The monostable circuit 192 of the dryer purge control is triggered in response to compressor unloading. The monostable circuit sets a timing function during which the dryer purge control circuit causes the dryer to be purged of moisture. Thereafter the circuit will allow no further purging until another purging cycle is commenced in response to the conclusion of the next compressor loading.

The signal from stage 198 is conducted to a further stage 204 which forms a logic signal which is supplied to both logic gates 194, 196. The logic signal developed by stage 204 distinguishes between sensed pressure of the pneumatic power supply being either greater than or less than a pressure below which the parking brakes should be operated.

Gates 194, 196 are OR logic gates. If the sensed pressure indicates that the parking brakes should be operated, the OR logic gates operate their respective transistors to cause the pneumatic valves 92, 94 to apply the parking brakes.

The gates 194, 196 are also under the control of the parking brake control devices 132, 134. PARK control 132 is connected in an input circuit 206 to both gates 194, 196. TRAILER control 134 is connected in an input circuit 208 to gate 196 only.

Whenever the TRAILER control device 134 commands trailer parking brake operation, gate 196 immediately acts on its transistor T.

Whenever the PARK control device 132 commands operation of the parking brakes of both tractor and trailer, gate 194 immediately causes the trailer brakes to be applied; however a delay section 210 results in slightly delayed operation of the tractor parking brakes. This is intended to insure that if a trailer is connected to the tractor, the trailer parking brakes will come on before the tractor's.

FIGS. 2 and 3 illustrate other embodiments for compressor unloading and dryer purge control. The differences in the embodiment of FIG. 2 from the embodiment of FIG. 1 are that the two valves 64, 70 are relocated from the wet tank to the compressor and dryer. The differences in the embodiment of FIG. 3 from the embodiment of FIG. 2 are that in FIG. 2, the valves are separate assemblies, while in FIG. 3 the valves are integrated into the compressor and the dryer.

The foregoing has described a new and improved electro-pneumatic tractor-trailer brake system in its various aspects. While a preferred embodiment has been disclosed, it will be appreciated that principles of the invention can be practiced in embodiments other than those disclosed herein.

What is claimed is:

1. In an automotive tractor which comprises a power-train-containing chassis including a powerplant which powers the tractor for automotive over-the-road travel and said chassis contains pneumatic-operated components which are powered from a pneumatic power supply, said pneumatic power supply comprising a tank for compressed air, a compressor which is driven by said powerplant and is operated to loaded and unloaded conditions such that when loaded, it draws and compresses air to charge said tank, said pneumatic power supply also comprising a dryer connected in pneumatic circuit with said compressor and said tank to remove condensed moisture from air compressed by said compressor, said dryer having a purge port at which condensed moisture is purged from said dryer, the improvement which comprises an electrically-responsive means associated with said compressor for controlling the loading and unloading of said compressor, further electrically-responsive means associated with said dryer for controlling purging of moisture from said dryer, an electric pressure transducer for providing a pressure signal representative of the pressure of air compressed into said tank by said compressor, and an electric circuit which comprises an input which receives the pressure signal from said electric pressure transducer, and output means connected to both said electrically-responsive means, said electric circuit comprising means for operating both said electrically-responsive means in accordance with the pressure signal of said electric pressure transducer.

2. The improvement set forth in claim 1 in which said electric circuit comprises means for causing said electrically-responsive means associated with said dryer to purge said dryer for a limited time in consequence of said electrically-responsive means associated with said compressor being operated by said electric circuit from loaded to unloaded condition such that a limited time purging of said dryer is conducted just after said compressor has concluded loaded operation.

* * * * *